July 19, 1927.
W. HEJMA
1,636,418
MOTOR SPADE
Filed July 19, 1923
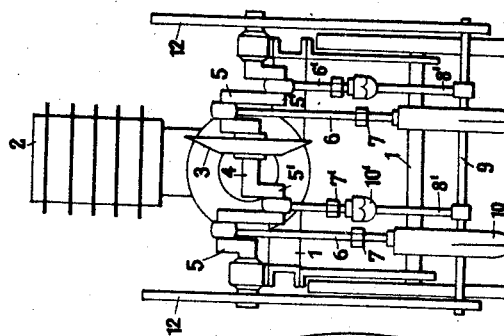
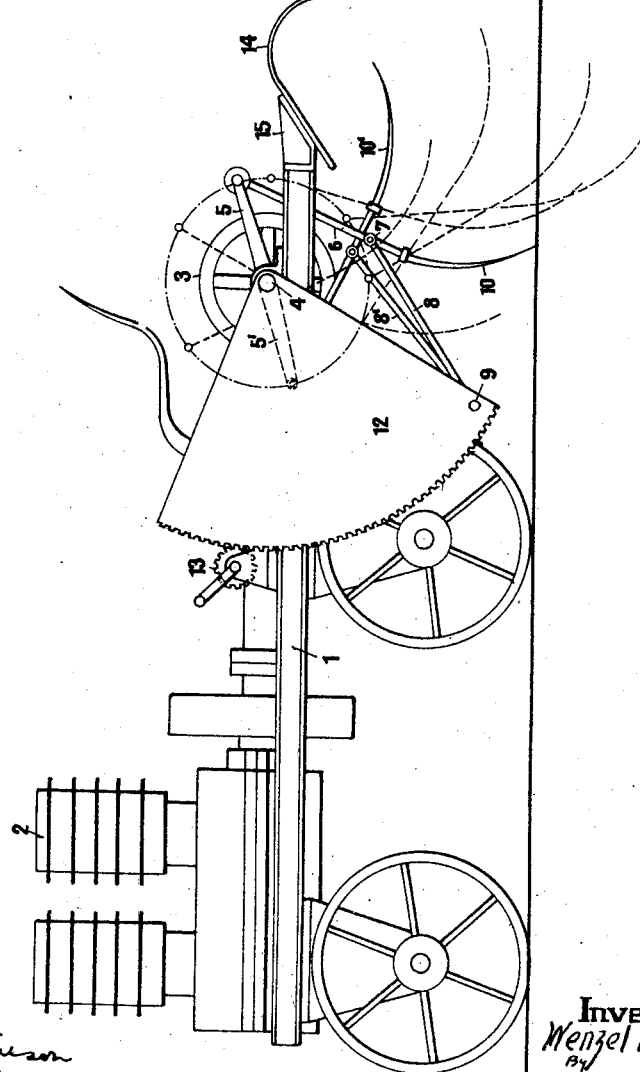
Witnesses
Charles B Stevenson
Harriet M. Schwartz
Inventor:
Wenzel Hejma
By
Maxwell Stevenson
his
attorney Patented July 19, 1927.

1,636,418

UNITED STATES PATENT OFFICE.

WENZEL HEJMA, OF BRNO, CZECHOSLOVAKIA.

MOTOR SPADE.

Application filed July 19, 1923, Serial No. 652,502, and in Czechoslovakia July 22, 1922.

This invention relates to new and useful improvements in motor spades and more particularly to an agricultural machine having a plurality of motor driven spades, shovels or other digging implements which are connected to a plurality of cranks thereby bringing the spades or the like successively in such a manner into engagement with the ground that each spade digs up a certain quantity of the soil, and throws it out of the ground.

A further object of the present invention is to so arrange a baffle plate that each quantity of soil dug up is thrown against this baffle plate and turned over.

In the accompanying drawing forming part of this application Fig. 1 shows a side elevation and Fig. 2 an end elevation of the new motor spade.

Referring to the drawings 1 is a frame mounted in well known manner upon two wheel axles and bearing a motor 2 for driving the bevelled wheels 3, 3 one of which is fastened to an elongation of the motor axle (not shown) and the other to the crank shaft 4. The cranks 5, 5' of the latter are pivotally connected with the upper ends of the beams 6, 6' of the spades or shovels 10, 10'. Pivotally connected with each end of the crank shaft is a sector 12 the arc of which possesses teeth meshing with the teeth of a pinion 13 which may be turned by means of a hand-crank. By turning the latter in one direction the sectors 12 are turned upwards and by turning the hand-crank in the other direction the sectors are turned downwards. The two sectors 12 at their lower corners possess each a hole in which an axle 9 is rigidly fastened. Pivotally connected with this axle are the ends of the rods 8, 8' the other ends of which are pivoted to the beams 6, 6' of the spades or shovels 10, 10' at points 7, 7' situated between the soil and a horizontal plane supposed to be laid through the central line of the crank shaft 4 and the ground. At the back of the frame 1 a baffle plate 14 of curved cross section is fastened to an arm 15.

Operation: The motor 2 by means of the bevelled wheels 3, 3 turns the crank shaft 4 in clockwise direction and the spades or shovels 10, 10' are successively brought into engagement with the ground in such a manner that a certain quantity of the soil is dug up and then thrown against the curved baffle plate, the curvature of which is chosen so as to turn the soil thrown against it over. By lifting the sectors 12, the axle 9 and the connecting rods 8, 8' the spades or shovels 10, 10' can be lifted in such a degree that they do not touch the ground.

I claim:—

1. In a mechanical digger of the type described, a frame, a crank journaled in said frame, a spade pivoted to the crank pin, a segment oscillable about the crank shaft, a link pivoted to said spade and to said segment, teeth on the arcuate periphery of said segment, gear means on said frame and in engagement with said teeth, and means for rotating said gear means.

2. In a motor spade of the type described, a frame, a crank journaled in said frame, a spade pivoted to the crank, a segment rockable about the crank shaft, a link pivoted to said spade and to said segment, the connection with the spade lying between the ground and the horizontal plane passing through the center of rotation of said crank, teeth on the arcuate periphery of said segment, gear means on the frame in engagement with said teeth, and means for rotating said gear means.

3. In a motor spade of the type described, a frame, a crank journaled in said frame, a spade pivoted to the crank, a segment rockable about the crank shaft, a link pivoted to said spade and to said segment, the connection with the spade lying between the ground and a horizontal plane passing through the center of rotation of said crank, teeth on the arcuate periphery of said segment, gear means on the frame in engagement with said teeth, means for rotating said gear means, and a curved baffle plate situated in the path of soil thrown by said spades.

In testimony whereof I affix my signature.

Dr. WENZEL HEJMA.